US008509078B2

(12) United States Patent (10) Patent No.: US 8,509,078 B2
Moscibroda et al. (45) Date of Patent: Aug. 13, 2013

(54) BUFFERLESS ROUTING IN ON-CHIP INTERCONNECTION NETWORKS

(75) Inventors: Thomas Moscibroda, Redmond, WA (US); Onur Mutlu, Pittsburgh, PA (US)

(73) Assignee: Microsoft Corporation, Redmond, WA (US)

( * ) Notice: Subject to any disclaimer, the term of this patent is extended or adjusted under 35 U.S.C. 154(b) by 427 days.

(21) Appl. No.: 12/370,467

(22) Filed: Feb. 12, 2009

(65) Prior Publication Data

US 2010/0202449 A1 Aug. 12, 2010

(51) Int. Cl.
*H04L 12/26* (2006.01)

(52) U.S. Cl.
USPC ............................................ 370/235; 370/230

(58) Field of Classification Search
USPC .................. 370/254, 238, 236, 351, 235, 389, 370/395.4, 248
See application file for complete search history.

(56) References Cited

U.S. PATENT DOCUMENTS

| 7,012,895 | B1 * | 3/2006 | Mir ................................ 370/235 |
| 7,221,677 | B1 * | 5/2007 | Reed et al. ...................... 370/404 |
| 7,467,358 | B2 * | 12/2008 | Kang et al. ..................... 716/126 |
| 2002/0051427 | A1 * | 5/2002 | Carvey .......................... 370/254 |
| 2003/0193901 | A1 * | 10/2003 | Ishibashi ........................ 370/252 |
| 2004/0022240 | A1 | 2/2004 | Mneimneh et al. |
| 2004/0213570 | A1 * | 10/2004 | Wai et al. ........................ 398/49 |
| 2005/0027880 | A1 * | 2/2005 | Emmot .......................... 709/238 |
| 2006/0165081 | A1 | 7/2006 | Benner et al. |
| 2006/0203825 | A1 * | 9/2006 | Beigne et al. ............ 370/395.42 |
| 2007/0297578 | A1 * | 12/2007 | Blair et al. .................... 379/67.1 |

OTHER PUBLICATIONS

Alverson, et al., "The Tera Computer System", retrieved on Dec. 30, 2008 at <<http://www.ai.mit.edu/projects/aries/course/notes/tera.pdf>>, Tera Computer Company, Seattle, WA., 1990 ACM, pp. 1-6.
Baran, "On Distributed Communications Networks", retrieved on Dec. 30, 2008 at <<http://ieeexplore.ieee.org/stamp/stamp.jsp?arnumber=1088883&isnumber=23673>>, IEEE Transactions on Communications Systems, Mar. 1964, pp. 1-9.
Bhansali, et al., "Framework for Instruction-level Tracing and Analysis of Program Executions", retrieved on Dec. 30, 2008 at <<http://www.usenix.org/events/vee06/full_papers/p154-bhansali.pdf>>, VEE 2006, Jun. 14-16, 2006, Ottawa, Ontario, Canada, pp. 154-163.
Borkar, "Thousand Core Chips—A Technology Perspective", retrieved on Dec. 30, 2008 at <<http://videos.dac.com/44th/papers/42_1.pdf>>, DAC 2007, Jun. 4-8, 2007, pp. 746-749.

(Continued)

*Primary Examiner* — Dang Ton
*Assistant Examiner* — Mandish Randhawa
(74) *Attorney, Agent, or Firm* — Lee & Hayes, PLLC

(57) ABSTRACT

As microprocessors incorporate more and more devices on a single chip, dedicated buses have given way to on-chip interconnection networks ("OCIN"). Routers in a bufferless OCIN as described herein rank and prioritize flits. Flits traverse a productive path towards their destination or undergo temporary deflection to other non-productive paths, without buffering. Eliminating the buffers of on-chip routers reduces power consumption and heat dissipation while freeing up chip surface area for other uses. Furthermore, bufferless design enables purely local flow control of data between devices in the on-chip network, reducing router complexity and enabling reductions in router latency. Router latency reductions are possible in the bufferless on-chip routing by using lookahead links to send data between on-chip routers contemporaneously with flit traversals.

20 Claims, 12 Drawing Sheets

(56) References Cited

OTHER PUBLICATIONS

Bouhraoua, et al., "An Efficient Network-on-Chip Architecture Based on the Fat-Tree (FT) Topology", retrieved on Dec. 30, 2008 at <<http://www.kfupm.edu.sa/publications/ajse/Articles/322C_P.02.pdf>> The Arabian Journal for Science and Engineering, vol. 32, No. 2C, Dec. 2007, pp. 13-26.

Bregni, et al., "Performance Evaluation of Deflection Routing in Optical IP Packet-Switch Networks", Cluster Computing, vol. 7, No. 3, Jul. 2004, pp. 239-244.

Busch, et al., "Routing without Flow Control", retrieved on Dec. 30, 2008 at <<http://www.cs.brown.edu/~mph/BuschHW01/SPAA01.pdf>>, Computer Science Dept., Brown University, 10 pgs.

Cho, et al., "Managing Distributed, Shared L2 Caches through OS-Level Page Allocation", retrieved on Dec. 30, 2008 at <<http://www.cs.pitt.edu/cast/papers/cho-micro06.pdf>>, Department of Computer Science, University of Pittsburgh, 11 pgs.

Dally, et al., "Route Packets, Not Wires: On-Chip Interconnection Networks", retrieved on Dec. 30, 2008 at <<http://cva.stanford.edu/publications/2001/onchip_dac01.pdf>> DAC 2001, Jun. 18-21, 2001, Las Vegas, Nevada, USA, 6 pgs.

Dally, "Virtual-Channel Flow Control", retrieved on Dec. 30, 2008 at <<http://ieeexplore.ieee.org/stamp/stamp.jsp?arnumber=127260&isnumber=3563>>, IEEE Transactions on Parallel and Distributed Systems, vol. 3, No. 2, Mar. 1992, pp. 194-205.

Eyerman, et al., "System-Level Performance Metrics for Multiprogram Workloads", retrieved on Dec. 30, 2008 at <<http://ieeexplore.ieee.org/stamp/stamp.jsp?arnumber=4550859&isnumber=4550851>>, published by the IEEE Computer Society, May-Jun. 2008, pp. 42-53.

Feige, et al., "Exact Analysis of Hot-Potato Routing", retrieved on Dec. 30, 2008 at <<http://ieeexplore.ieee.org/stamp/stamp.jsp?arnumber=267796&isnumber=6693>>, IBM T.J. Watson Research Center, Yorktown Heights, NY, IEEE 1992, pp. 553-562.

Frailong, et al., "XOR-Schemes: A Flexible Data Organization in Parallel Memories", IEEE Computer Society Press, Proceedings of the 1985 International Conference on Parallel Processing, Aug. 20-23, 1985, pp. 276-283, 10 pgs.

Gabor, et al., "Fairness and Throughput in Switch on Event Multithreading", retrieved on Dec. 30, 2008 at <<http://ieeexplore.ieee.org/stamp/stamp.jsp?arnumber=04041843>>, The 39th Annual IEEE/ACM International Symposium on Microarchitecture (MICRO 2006), 12 pgs.

Gomez, et al., "BPS: A Bufferless Switching Technique for NoCs", retrieved on Dec. 30, 2008 from <<http://www.gap.upv.es/~crigore/wina08.pdf>>, Dept. of Computer Engineering, Universidad Politecnica de Valencia, Spain, Jan. 7, 2008, pp. 1-6.

Gomez, et al., "Reducing Packet Dropping in a Bufferless NoC", Book Series Lecture Notes in Computer Science, Springer Berlin / Heidelberg, vol. 5168/2008, Book Euro-Par 2008—Paralell Processing, Aug. 21, 2008, pp. 899-909.

Gowan, et al., "Power Considerations in the Design of the Alpha 21264 Microprocessor", retrieved on Dec. 30, 2008 at <<http://ieeexplore.ieee.org/stamp/stamp.jsp?arnumber=724567&isnumber=15604>>, ACM 1998, pp. 726-731.

Gratz, et al., "Implementation and Evaluation of On-Chip Network Architectures", retrieved on Dec. 30, 2008 at <<http://www.cs.utexas.edu/users/ckkim/papers/ocn_eval.pdf>>, ICCD 2006, 8 pgs.

Gravano, et al., "Adaptive Deadlock-and Livelock-Free Routing With all Minimal Paths in Torus Networks", retrieved on Dec. 30, 2008 at <<http://www1.cs.columbia.edu/~gravano/Papers/1994/tpdsDec94.pdf>>, IEEE Transactions on Parallel and Distributed Systems, vol. 5, No. 12, Dec. 1994, pp. 1233-1251.

Greenberg. et al., "Sharp Approximate Models of Deflection Routing in Mesh Networks", retrieved on Dec. 30, 2008 at <<http://ieeexplore.ieee.org/stamp/stamp.jsp?arnumber=00212380>>IEEE Transactions on Communications, vol. 41, No. 1, Jan. 1993, 14 pgs.

Hoskote, et al., "A 5-GHz Mesh Interconnect for a Teraflops Processor", retrieved on Dec. 30, 2008 from <<http://ieeexplore.ieee.org/stamp/stamp.jsp?arnumber=4378783&isnumber=4378774>>, IEEE Computer Society, Sep.-Oct. 2007. pp. 51-61.

Jerger, et al., "Circuit-Switched Coherence", retrieved on Dec. 30, 2008 at <<http://ieeexplore.ieee.org/stamp/stamp.jsp?arnumber=04278825>>, IEEE Computer Architecture Letters, vol. 6, 2007, 4 pgs.

Katevenis, "Wormhole IP over (Connectionless) ATM", retrieved on Dec. 30, 2008 at <<http://archvlsi.ics.forth.gr/wormholeIP/arch98/wIP_98.html>>ICS-FORTH, Crete, Greece, Jul. 1998, 25 pgs.

Kim, et al., "An Adaptive, Non-Uniform Cache Structure for Wire-Delay Dominated On-Chip Caches", ACM, ACM SIGPLAN Notices, vol. 37, Issue 10, Computer Architecture, Oct. 2002, pp. 211-222.

Kim, et al., "Flattened Butterfly Topology for On-Chip Networks", retrieved on Dec. 30, 2008 at <<http://cva.stanford.edu/publications/2007/MICRO_FBFLY.pdf>>, Computer Systems Laboratory, Stanford University, CA, 11 pgs.

Konstantinidou, et al., "Chaos router: architecture and performance", retrieved on Dec. 30, 2008 at <<http://ieeexplore.ieee.org/stamp/stamp.jsp?arnumber=1021614&isnumber=21977>> ACM 1991, pp. 212-221.

Kroft, "LockUp-Free Instruction Fetch/Prefetch Cache Organization", retrieved on Dec. 30, 2008 at <<http://www.cs.auckland.ac.nz/compsci703s1c/resources/Kroft.pdf>>, Control Data Canada, Ltd., IEEE 1981, pp. 81-87.

Kumar, et al., "A 4.6Tbits/s 3.6GHz Single-cycle NoC Router with a Novel Switch Allocator in 65nm CMOS" retrieved on Dec. 30, 2008 from <<http://iccd.et.tudelft.nl/Proceedings/2007/Papers/1.3.3.pdf>>, Department of Electrical Engineering, Princeton University, Microprocessor Technolofy Labs, Intel Corp, Intel Technology India Pvt Ltd., IEEE 2007, 8 pgs.

Kumar, et al, "Express Virtual Channels: Towards the Ideal Interconnection Fabric", retrieved on Dec. 30, 2008 at <<http://www.princeton.edu/~peh/publications/evcs.pdf>>, ISCA 2007, Jun. 9-13, 2007, 12 pgs.

Kumar, et al., "Token Flow Control", retrieved on Dec. 30, 2008 at <<http://www.princeton.edu/~peh/publications/tfc.pdf>>, Department of Electrical Engineering, Princeton University, Princeton, NJ, 12 pgs.

Lemaire, et al., "Performance Evaluation of a NoC-Based Design for MC-CDMA Telecommuncations using NS-2", retrieved on Dec. 30, 2008 at <<http://ieeexplore.ieee.org/stamp/stamp.jsp?arnumber=1509429&isnumber=32325>> Proceedings of the 16th International Workshop on Rapid System Prototyping (RSP 05), IEEE 2005, 7 pgs.

Linder, et al., "An Adaptive and Fault Tolerant Wormhole Routing Strategy for k-ary n-cubes", retrieved on Dec. 30, 2008 at <<http://ieeexplore.ieee.org/stamp/stamp.jsp?arnumber=00067315>>, IEEE Transactions on Computersm vol. 40, No. 1, Jan. 1991, pp. 2-12.

Lu, et al., "Admitting and Ejecting Flits in Wormhole-Switched Networks on Chip" retrieved on Dec. 30, 2008 at <<http://ieeexplore.ieee.org/stamp/stamp.jsp?arnumber=04312781>>IET Comput. Digit. Tech., vol. 1, No. 5, Sep. 2007, pp. 546-556.

Lu, et al., "Evaluation of On-chip Networks Using Deflection Routing", retrieved on Dec. 30, 2008 at <<http://web.it.kth.se/~axel/papers/2006/GLSVLSI-zhonghai-lu.pdf>>, Department of Electronic, Computer and Software Systems Royal Institute of Technology in Sweden, GLSVLSI 2006, Apr. 30-May 2, 2006, 6 pgs.

Lu, "Using Wormhole Switching for Networks on Chip: Feasibility Analysis and Microarchitecture Adaptation", retrieved on Dec. 30, 2008 at <<http://www.diva-portal.org/diva/getDocument?urn_nbn_se_kth_diva-562-2_fulltext.pdf>>Royal Institute of Technology, Department of Microelectronics and Information Technology Laboratory of Electronics and Computer Systems Electrum 229 S-164 40 Kista, Sweden, May 2005, 70 pgs.

Luk, et al., "Pin: Building Customized Program Analysis Tools with Dynamic Instrumentation", retrieved on Dec. 30, 2008 at <<http://citeseerx.ist.psu.edu/viewdoc/download;jsessionid=0CE4B7ED90375FCF05C60EBA2135F42A?doi=10.1.1.85.4883&rep=rep1&type=pdf>>, PLDI 2005, Jun. 12-15, 2005, pp. 1-11.

Luo, et al., "Balancing Thoughput and Fairness in SMT Processors" retrived on Dec. 30, 2008 at <<http://ieeexplore.ieee.org/stamp/stamp.jsp?arnumber=00990695>>, IEEE 2001, pp. 164-171.

Michelogiannakis, "Approaching Ideal NoC Latency with Pre-Configured Routes", retrieved on Dec. 30, 2008 at <<http://www.stanford.edu/~mihelog/figures/thesis.pdf>>, Computer Science Department School of Sciences and Engineering, University of Crete, Greece, Jun. 2007, 79 pgs.

Micron. 1Gb DDR2 SDRAM Component: MT47H128M8HQ-25, retrieved on Dec. 30, 2008 at <<http://download.micron.com/pdf/datasheets/dram/ddr2/1GbDDR2.pdf>>, Micron Technology, Inc., 2004, pp. 1-135.

Millberg, et al., "Guaranteed Bandwidth using Looped Containers in Temporally Disjoint Networks within the Nostrum Network on Chip", retrieved on Dec. 30, 2008 at <<http://citeseerx.ist.psu.edu/viewdoc/download?doi=10.1.1,59.1697&rep=rep1&type=pdf>>, Laboratory of Electronic & Computer Systems, Royal Institute of Technology (KTH), Sweden, 6 pgs.

Mullins, et al., "Low-Latency Virtual-Channel Routers for On-Chip Networks", retrieved on Dec. 30, 2008 at <<http://www.cl.cam.ac.uk/~rdm34/isca2004.pdf>>, Proceedings on the 31st Annual International Symposium on Computer Architecture (ISCA 2004), pp. 1-10.

Mutlu, et al., "Stall-Time Fair Memory Access Scheduling for Chip Multiprocessors", retrieved on Dec. 30, 2008 at <<http://research.microsoft.com/en-us/um/people/moscitho/Publications/MICRO2007.pdf>> Microsoft Research, 13 pgs.

Natvig, "High-level Architectural Simulation of the Torus Routing Chip", retrieved on Dec. 30, 2008 at <<http://citeseerx.ist.psu.edu/viewdoc/download;jsessionid=61FA671436BAF88C66590A1F048993FE?doi=10.1.1.37.7680&rep=rep1&type=pdf>>Proceedings of International Verilog HDL Conference, California, Mar.-Apr. 1997, pp. 1-8.

Nesson, et al., "ROMM Routing on Mesh and Torus Networks", retrieved on Dec. 30, 2008 at <<http://citeseerx.ist.psu.edu/viewdoc/download?doi=10.1.1.35.9221&rep=rep1&type=pdf>>, Proceedings of the 7th Annual ACM Symposium on Parallel Algorithms and Achitectures, Jul. 16-18, 1995, 14 pgs.

Owens, et al., "Research Challenges for On-Chip Interconnection Networks", retrieved on Dec. 30, 2008 at <<http://ieeexplore.ieee.org/stamp/stamp.jsp?arnumber=4378787&isnumber=4378774>>, IEEE Computer Society, Sep.-Oct. 2007, pp. 96-108.

Patil, et al., "Pinpointing Representative Portions of Large Intel Itanium Programs with Dynamic Instrumentation", retrieved on Dec. 30, 2008 at <<http://rogue.colorado,edu/Pin/docs/papers/micro37_patilh_pinpoints.pdf>>, Proceedings of the 37th Annual IEEE/ACM International Symposium on Microarchitecture (MICRO-37 2004), pp. 1-12.

Peh, et al., "A Delay Model and Speculative Architecture for Pipelined Routers", retrieved on Dec. 30, 2008 at <<http://cva.stanford.edu/publications/2001/specmodel.pdf>>, In Proceedings of the 7th International Symposium on High-Performance Computer Architecture, Jan. 22-24, 2001, Monterrey, Mexico, pp. 255-266.

Singh, et al., "Goal: A Load-Balanced Adaptive Routing Algorithm for Torus Networks", retrieved on Dec. 30, 2008 at <<http://ieeexplore.ieee.org/stamp/stamp.jsp?arnumber=01207000>>, Proceedings of the 30th Annual International Symposium on Computer Architecture (ISCA 2003), 12 pgs.

Smith, "A Pipelined, Shared Resource MIMD Computer", International Conference on Parallel Processing, 1978, pp. 6-8.

Smith, "Architecture and applications of the HEP multiprocessor computer system", retrieved on Dec. 30, 2008 at <<http://adsabs.harvard.edu/abs/1981SPIE..298..241S>>, Advances in Laser Scanning Technology, SPIE Proceedings vol. 298. Bellingham, WA: Society for Photo-Optical Instrumentation Engineers, 1981., p. 241.

Snavely et al., "Symbiotic Jobscheduling for a Simultaneous Multithreading Processor", retrieved on Dec. 30, 2008 at <<http://www-cse.ucsd.edu/users/tullsen/asplos00.pdf>>, published in the Proceedings of ASPLOS IX, Nov. 2000, 11 pgs.

Taylor, et al., "Evaluation of the Raw Microprocessor: An Exposed-Wire-Delay Architecture for ILP and Streams", retrieved on Dec. 30, 2008 at <<http://citeseerx.ist.psu.edu/viewdoc/download;jsessionid=5D0811B2CD61850B996A044E9994508B?doi=10.1.1.10.4726&rep=rep1&type=pdf>>, CASIL, Massachusetts Institute of Technology, 12 pgs.

Wang, et al., "Burst optical deflection routing protocol for wavelength routing WDM networks" retrieved on Dec. 30, 2008 at <<http://www.mlab.t.u-tokyo.ac.jp/publications/./2002/xi-spie02.pdf>>, School of Engineering, The University of Toyko, Japan, 11 pgs.

Wang, et al., "Orion: A Power-Performance Simulator for Interconnection Networks", retrieved on Dec. 30, 2008 at <<http://citeseerx.ist.psu.edu/viewdoc/download?doi=10.1.1.10.4193&rep=rep1&type=pdf>>, Department of Electrical Engineering, Princeton University, Princeton, NJ, 12 pgs.

Wentzlaff, et al., "On-Chip Interconnection Architecture of the Tile Processor", retrieved on Dec. 30, 2008 at <<http://ieeexplore.ieee.org/stamp/stamp.jsp?arnumber=4378780&isnumber=4378774>>, IEEE Computer Society, Sep.-Oct. 2007, pp. 15-31.

Dally, et al., "Principles and Practices of Interconnection Networks", Morgan Kaufmann Publishers, © 2004 by Elsevier, Inc., pp. 1-550.

Hillis, "The Connection Machine", MIT Press, 1989, © 1985 by The Massachusetts Institute of Technology, pp. 1-190.

* cited by examiner

BUFFERLESS ROUTING IN ON-CHIP INTERCONNECTION NETWORKS

BACKGROUND

The increasing complexity of microprocessor chips has led to single chips containing several devices. These devices include one or more of the following: a processor core, cache memory, input/output circuitry, graphics processors, etc. Conventional communication between on-chip devices using dedicated busses has given way to on-chip interconnection networks ("OCINs"). OCINs use network communication pathways and routers on the chip to direct data between on-chip devices. This data may be in packets, with each packet divided into smaller flow control digits (abbreviated as "flits").

Traditionally OCINs incorporate routers with buffers, in order to maximize bandwidth efficiency. Unfortunately, these router buffers introduce several serious drawbacks at the small scale of a single chip. First, router buffers consume significant amounts of power, even when not storing data. This power consumption not only is wasteful of electrical energy, but also increases heat dissipation of the chip. Second, using buffers increases the complexity of the network design by requiring logic circuitry to handle the buffering. Finally, buffers consume significant amounts of valuable surface area on the chip itself, reducing the available for other uses.

Thus, there is a need for an OCIN which does not require the use of buffers.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

As described above, the increased number of on-chip devices on a single microprocessor chip has resulted in the use of on-chip interconnection networks ("OCIN") to pass data between these on-chip devices. Eliminating the buffers of on-chip routers reduces power consumption and heat dissipation and possibly router latency. Also, chip surface area previously consumed by buffer memory is available for other uses.

In the OCIN described herein, incoming flits in a router are ranked by criterion such as age, number of deflections, round robin selection, etc. The ranked flits are prioritized to output ports. Because no buffers (or minimal buffers) are available, each incoming flit should go somewhere. Thus, when leaving a router, flits may either traverse a productive path leading flits closer towards their destination or be "deflected" to other non-productive paths where the flits are further from their destination. Discussed below are three prioritization processes: bufferless routing of flits ("FLIT-BLESS"), bufferless routing of worms ("WORM-BLESS"), and WORM-BLESS with buffers.

In one example, each on-chip router ("router") in the OCIN may satisfy two conditions: First, the number of input ports on each router equal the number of output ports. Second, each router can reach every other router, either directly or through other routers or devices. In situations where the network utilization is low, that is, the network is at less than its saturation point, bufferless routing described herein provides good performance while realizing the abovementioned advantages.

The disclosed OCIN also enables substantially local flow control of data between devices in the on-chip network, further resulting in reduced router complexity and also enabling reductions in router latency in at least two ways. First, router latency is reduced by eliminating operations associated with buffers, such as buffer writes and reads. Second, router latency may be reduced by sending lookahead routing information via a lookahead link contemporaneously with traversal of a flit in a switch and then computing the route at the next router while the flit traverses from the link.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
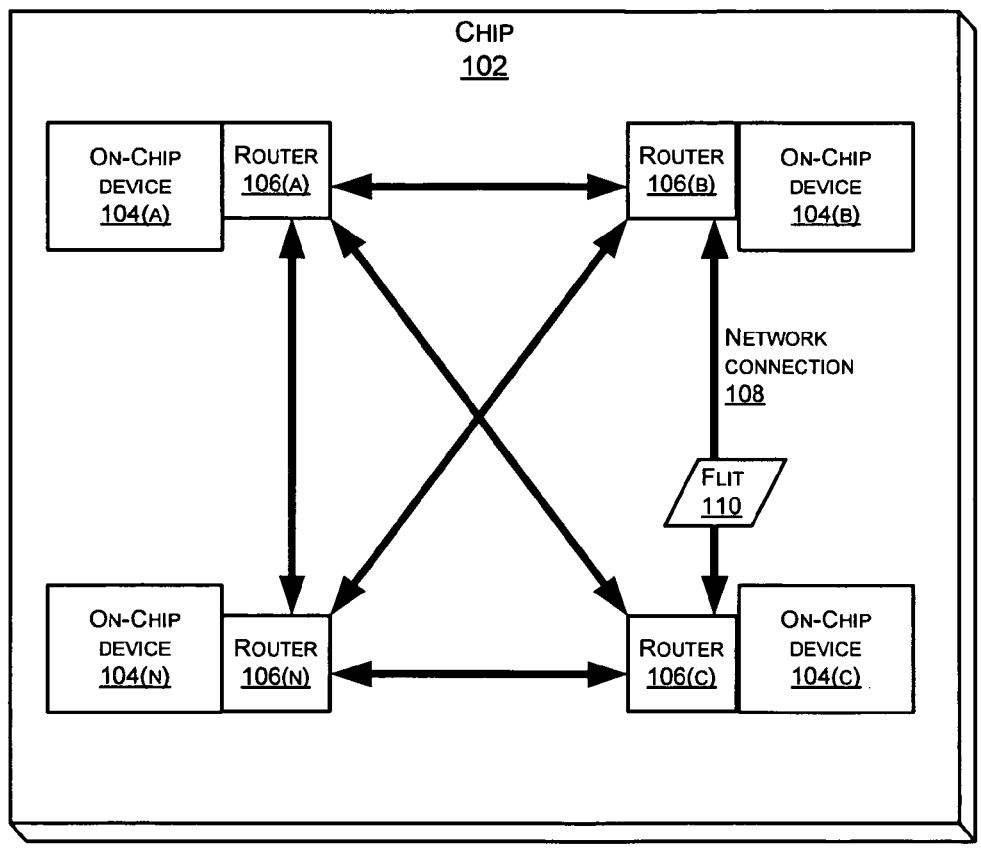
FIG. 1 is a schematic of an illustrative chip environment with a bufferless on-chip interconnection network.

As described above, traditional OCINs use routers with buffers. OCINs generally provide the advantage of simplifying design and development of System-on-a-Chip ("SoC") and other highly integrated single chip assemblies containing multiple on-chip devices. Until now, these advantages came with significant disadvantages.

One common characteristic of traditional OCINs has been the use of buffers. Buffers are memory devices used to store data for later forwarding. Traditional thought is that buffers are necessary in OCINs, primarily to maximize bandwidth efficiency. However, eliminating buffers allows realization of the following advantages.

First, buffers consume relatively large quantities of power. Buffers utilize dynamic energy when data is read/written and static energy even when no data is being stored. In low-power applications such as mobile devices or server farms, this power consumption can become significant. Furthermore, this energy ultimately dissipates as heat. This increases overall design complexity with regards to thermal management. Thus, eliminating buffers reduces power consumption and heat dissipation.

Second, buffers consume significant amounts of surface area on the chip. This reduces the surface area available for other devices on the chip. Furthermore, this size results in a direct impact on chip production and yields. For example, reducing an entire SoC assembly to one-half size allows production of twice as many SoC's in the same fabrication facility.

Even with a small number of total buffer entries per router, the required surface area for buffer memory becomes large. For example, if there are 16 total buffer entries per router where each buffer can store 64 bytes of data, an OCIN with 64 routers requires 64 kilobytes (KB) of buffer storage. By removing buffers, surface area is freed for other uses such as additional on-chip devices or to reduce overall chip size requirements.

Third, elimination of buffers in the OCIN simplifies flow control, permitting purely local flow control. In purely local flow control, communication between the routers is unnecessarily. This eliminates the complexity of buffered designs which involve exchanging control data between routers. In the purely local flow control described herein, a router only injects data into the network through an output port when at least one input port connected to another device is free. Every flit that enters a router will immediately leave the router. This is always possible because the number of output ports is greater than or equal to the number of input ports on each device. As a result, deadlocks cannot occur. Thus, eliminating buffers simplifies design and operation of the OCIN.

To implement bufferless routing, ranking and prioritizing of flits takes place in the on-chip routers. Ranking is accomplished using a variety of processes including oldest first, closest first, most deflections first, round robin, mixed policy, must-schedule first, etc. Ranked flits are then prioritized to output ports.

Three forms of prioritization are described herein. The first prioritization discussed is "FLIT-BLESS." FLIT-BLESS is bufferless flit-level prioritization where the ranked flits are assigned to productive ports when available, and non-productive ports when the productive ports are unavailable. Each flit is routed independently through the network and hence, each flit needs to contain routing information. While additional wires between routers may be necessary to contain this flit routing information, the energy consumed by these additional wires can be small compared to the energy savings resulting from removing buffers.

In another implementation, a fully or "lightly" buffered OCIN may also utilize FLIT-BLESS. A "lightly buffered" router is one in which the buffer is smaller than that found in traditional routers. In a lightly buffered environment, flits may be allocated to productive ports, buffered when the productive ports are unavailable, and assigned to non-productive ports when the buffer is full.

The second prioritization discussed is "WORM-BLESS." A worm is a sequence of flits having a head-flit containing destination or simple routing information followed by body-flits. In worm based OCIN routing, the head-flit establishes a route path and the remaining body-flits follow the route path of the head-flits. Head-flits are prioritized in WORM-BLESS to output ports and may displace existing lower ranking worms.

The third prioritization discussed is "WORM-BLESS with buffers." As with WORM-BLESS above, head-flits of worms may truncate lower ranking worms. However, in this "lightly buffered" implementation, flits designated as "must schedule" enjoy bufferless routing while non-"must schedule" flagged flits are buffered. In this implementation, it is not necessary for each router to have a buffer. Also, the buffer size may be smaller than those in traditionally fully-buffered OCINs because only some flits are buffered, not all.

Finally, there is an opportunity to reduce latency in the OCIN. With the addition of a lookahead link between routers, during switch traversal of a flit in a first router, the first router may send lookahead information to a second router via the lookahead link. The second router then uses the lookahead information to compute the route of the flit while the flit traverses the link from the first to the second link. The second router then sends lookahead information on to the next router while the flit traverses the switch in the second router, and so on. Thus, while the first router pipeline involves two stages to do the initial route computation followed by the switch traversal, subsequent routers using the lookahead information can complete this in one stage. This lookahead link may be narrower (that is, lesser bandwidth) than the network connection, further simplifying design.

Bufferless On-Chip Interconnection Network Environment

FIG. 1 is a schematic of an illustrative chip environment with a bufferless on-chip interconnection network 100. Chip 102 has a substrate, and may incorporate several on-chip devices 104 on this same substrate. On-chip devices 104 may be processor cores, cache memory, graphics processors, input/output devices, etc. Each on-chip device 104 couples to an on-chip router ("router") 106. Each router 106 is connected via network connection 108 to other routers. Network connection 108 is used for the transmission of flits 110 between the routers.

In the illustrated example, on-chip device 104(A) couples to router 106(A). On-chip device 104(B) couples to router 106(B). On-chip device 104(C) couples to router 106(C). On-chip device 104(N) couples to router 106(N).

Network connections 108 between routers 106 form a fully connected mesh network where each router has a direct connection to every other router. However, any network topology where a router is reachable from every other router is suitable, such as Grid, Torus, Hypercubes, Trees, etc.

Figure 2:
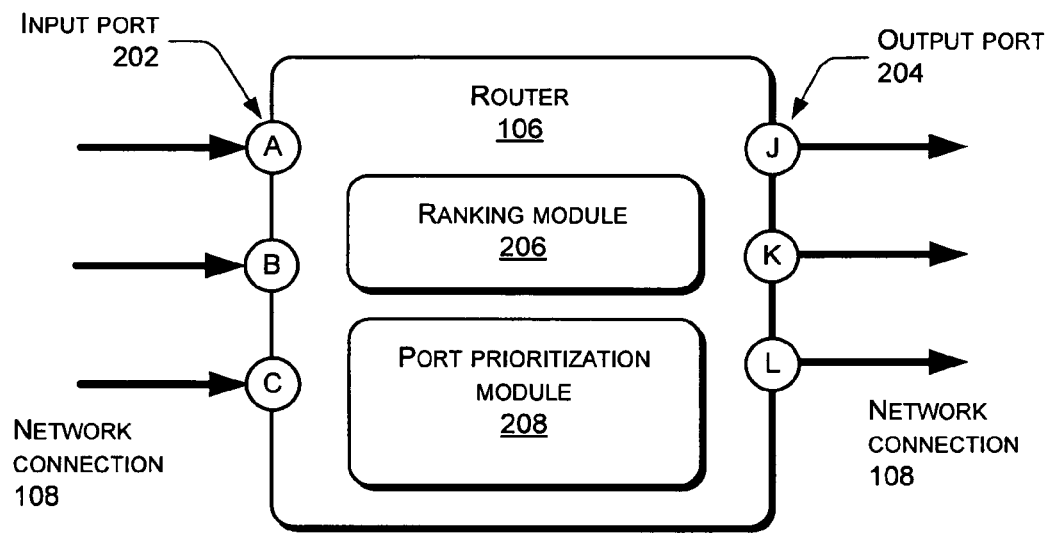
FIG. 2 is a schematic of the router from the bufferless on-chip interconnection network of FIG. 1.

FIG. 2 is a schematic 200 of the router from the bufferless on-chip interconnection network of FIG. 1. Router 106 is shown with three input ports 202 labeled A, B, and C. Input ports 202 couple to network connection 108 and receive inbound data. Router 106 also includes three output ports 204 labeled J, K, and L. Outputs ports 204 couple to network connection 108 and send outbound data. Data may be sent or received from other routers or from the on-chip device 104 connected to router 106. In these figures, a single line indicates input ports 202 and output ports 204 and their associated network connections 108. However, each port and associated network connection may include multiple conductors for transmitting electrical signals.

Within router 106 is a ranking module 206. As described later, the ranking module ranks incoming data received by the input ports 202. Once ranked, prioritization module 208 prioritizes the data to output ports 204 for transmission to the next router.

Figure 3:
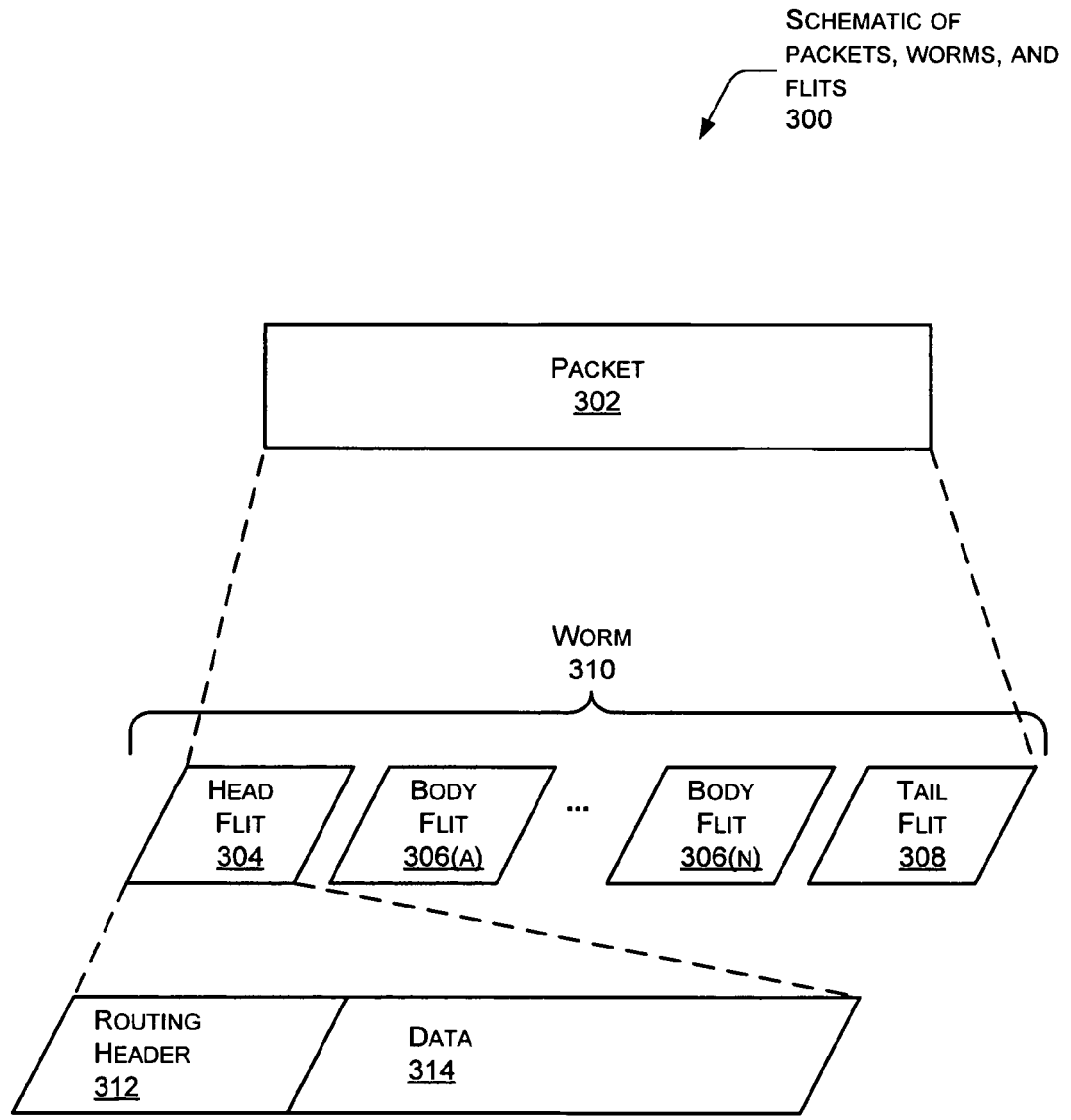
FIG. 3 is a schematic of illustrative packets, worms, and flits as used by the on-chip interconnection network of FIG. 1.

FIG. 3 is a schematic of illustrative packets, worms, and flits 300 as used by the on-chip interconnection network of FIG. 1. Data sent and received by router 106 along network connections 108 may be a packet 302 or divided into one or more "flits." "Flit" is an abbreviation for flow control digits. Wormhole-based routing systems may divide a packet 302 into a head-flit 304, body-flits 306(A) through 306(N) and a tail-flit 308. Thus, a "worm" 310 includes the head-flit 304, body-flits 306(A)-306(N), and tail-flit 308. The head-flit 304 may include a routing header indicating a destination, as well as data 314. The invention disclosed herein may utilize packets, flits, or smaller pieces of data. For convenience, but not as a limitation, this application uses the terms flit and worm, but the processes described herein may apply equally to packets, flits, or sub-flit units. Also, in non-worm based flit routing systems, each flit is a head flit.

Ranking Flits

Figure 4:
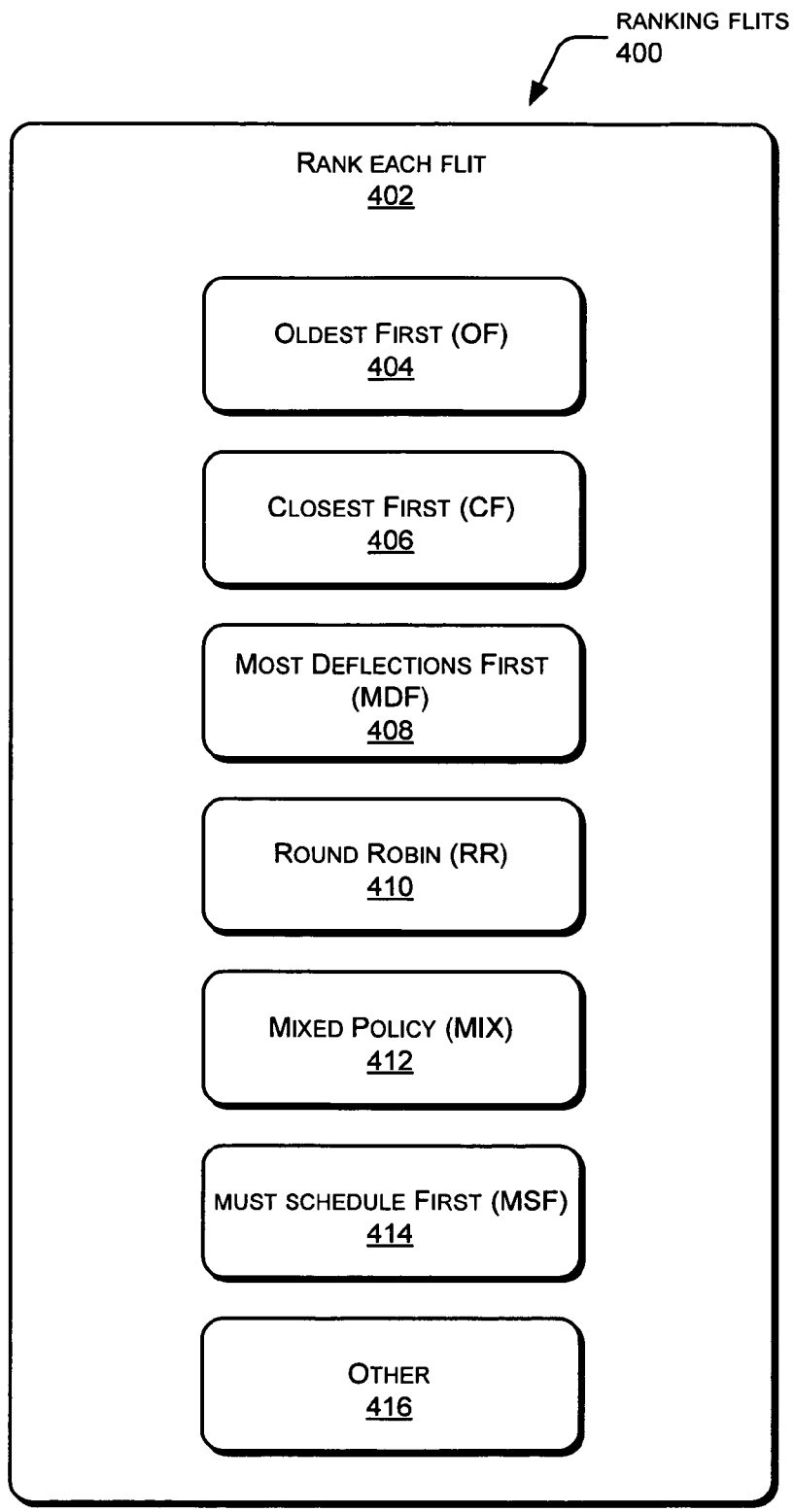
FIG. 4 is a flow diagram of an illustrative process for ranking flits.

FIG. 4 is a flow diagram of an illustrative process for ranking flits 400. At block 402, two or more flits are ranked relative to one another using a ranking policy. At block 404, ranking policy Oldest First ("OF") ranks older flits rank above newer flits. At block 406, ranking policy Closest First ("CF") ranks flits closer to their destination above flits with a longer distance to their destination. As described above, when leaving a router, a flit may either traverse a productive path leading the flit closer towards their destination or be "deflected" to other non-productive paths where the flit is further from its destination. At block 408, ranking policy Most Deflections First ("MDF") ranks flits with a greater number of deflections (that is, routings to non-productive ports) above flits deflected less often. At 410, ranking policy Round Robin ("RR") ranks flits from different input ports in a round-robin fashion. At block 412, ranking policy Mixed ("MIX") may combine several ranking policies in a hybrid policy. For example, MIX may use OF block 404 every odd cycle and RR block 410 every even cycle, or any other combination of the above ranking schemes. At block 414, where a must schedule first (MSF) flag is used as described below, flits having must schedule flag set to true are ranked above other flits. At block 416, other ranking policies may also be used.

In combination with the prioritization described below, ranking policy OF block 404 also guarantees the avoidance of livelocks. By ranking the oldest flit highest, the oldest flit is always sent in a productive direction. This also guarantees no live- or deadlocks because once a flit is the oldest flit in the network, it cannot be deflected and is guaranteed to make forward progress until reaching its destination.

FLIT-BLESS—Bufferless Routing of Flits

As described above, in bufferless routing every flit must be routed in every cycle to an output port. In one implementation, the decision as to which output port to route a flit to involves ranking and prioritization. One of the several methods described above ranks flits individually. Each flit in this ranking may then be prioritized to decide which output port is assigned to this flit. Once a flit is assigned to an output port, no subsequent flit with a lower-rank may be assigned to this output port.

Figure 5:
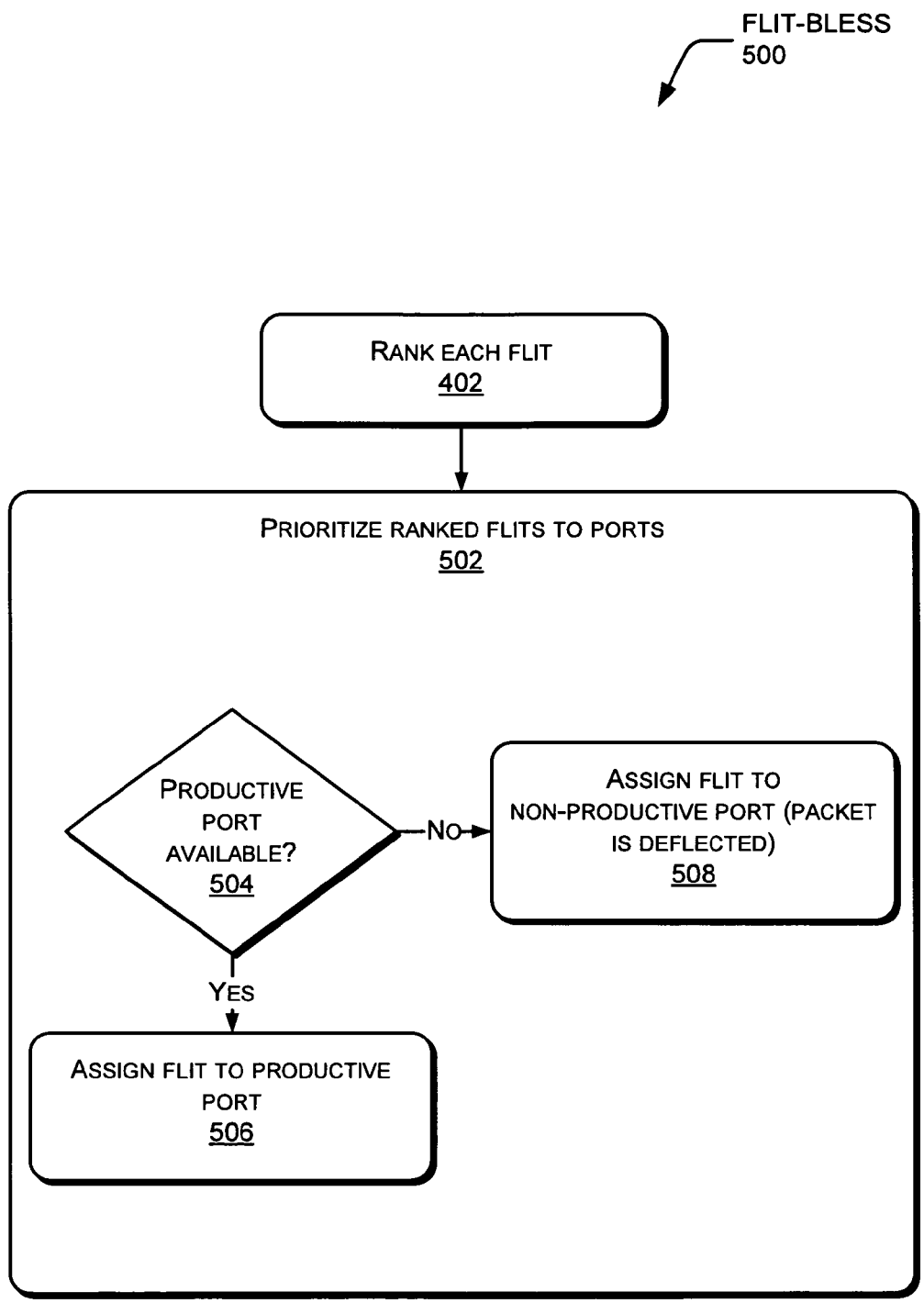
FIG. 5 is a flow diagram of an illustrative FLIT-BLESS routing process.

FIG. 5 is a flow diagram of an illustrative FLIT-BLESS routing process 500. FLIT-BLESS routing uses bufferless flit-level prioritization. At block 402, flits are ranked as described above after receipt by input ports. At block 502 ranked flits are prioritized to output ports, as described next in the order of their rank (the highest ranked flit is prioritized to an output port first). Within block 502, block 504 determines whether a productive port is available. When a productive port is available, block 506 assigns the flit to the productive port. When a productive port is not available, such as when a higher ranked flit was already assigned to this port, block 508 assigns the flit to the non-productive port, thus deflecting the packet. When two productive ports are available with the same priority, dimension order routing may be used to select one output port over another. In dimension order routing, one port is always favored, and only free output ports (i.e., those not already assigned to a higher-ranked flit in the same cycle) are considered.

Implicit in FLIT-BLESS is that an on-chip device 104 may safely inject a flit into a router when at least one input port from another router is free. In one implementation of bufferless routing, where one input port is free, there must be at least one free output port. Whenever the number of output ports is greater than or equal to the number of input ports, this remains true. Thus, when at least one input port is free, there is at least one free output port where the flit may be sent. Every on-chip device can now decide for itself whether or not it can inject a flit in a given cycle. This allows entirely local flow and admission control and eliminates the need for credit-based methods to avoid overflows.

WORM-BLESS

WORM-BLESS allows for bufferless operation in a worm-based environment. Wormhole-routing involves the use of head-flits which contain routing information, while the remainder of the flits associated with the head-flit (that is the "body" of the worm) follow the head-flit through the network. Wormhole routing offers at least three advantages over flit based routing: First is reduced power consumption. Second is likely-improved latency. Third is lower requirements for receiver-side buffering. First, power consumption is reduced because body-flits do not need to have additional routing header wires activated since the head-flit has already conveyed that information. Second, latency is likely improved because the flits in a worm follow the same path through the network, rather than each flit potentially following separate paths and encountering varying delays or detours. Third, receiver-side buffering requirements are smaller because the flits in a worm follow the same path through the network instead of several different routes which may alter the order in which flits are received which would require increased receiver-side buffering to store the flits in order to reassemble the flits in their intended sequence.

A distinction between allocation and assignment clarifies the routing process described next. Worms are "allocated" to output ports when a head-flit crosses the router. To maintain this allocation, the router maintains state-information as to which worm is routed to which output port. In contrast, when a flit is "assigned" to an output port the flit is irrevocably committed to that output port. An allocation may thus be modified in the future, while an assignment may not be.

The prioritization process during the routing process tries to avoid assigning flits from another worm to an allocated port. Instead, the prioritization process tries to assign flits from a worm to the port that this worm is allocated to. However, in some special cases as discussed below, there may be a need to nonetheless assign a flit to a port that has been allocated to another worm. In such a case, the port gets allocated to the new worm and the previous worm is "truncated."

Figure 6:
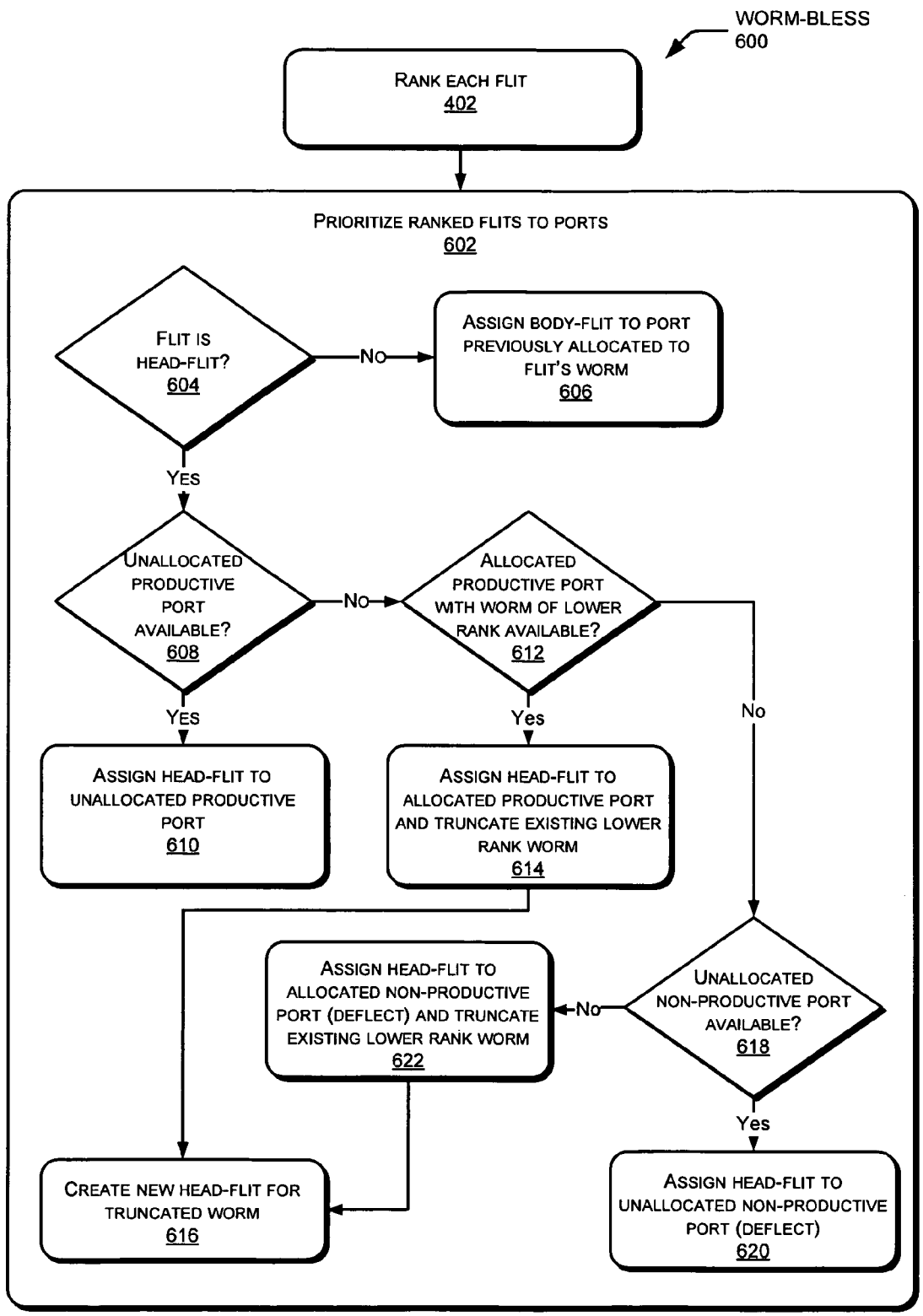
FIG. 6 is a flow diagram of an illustrative WORM-BLESS routing process.

FIG. 6 is a flow diagram of an illustrative WORM-BLESS routing process 600. At block 402, flits are ranked as described above in FIG. 4 after receipt by input ports. At block 602, ranked flits are prioritized to output ports using WORM-BLESS as described next. Within block 602, block 604 determines whether a flit is a head-flit or not. When a flit is determined at block 604 to not be a head-flit, the flit is a body-flit or tail-flit and assigned to the port previously allocated to that flit's worm.

When block 604 determines a flit to be a head-flit, block 608 determines if an unallocated productive port is available. When an unallocated productive port is available, block 610 assigns the flit to the unallocated productive port.

When an unallocated productive port is not available, block 612 determines if there is a previously allocated productive port with a worm of lower rank. When an allocated productive port is found to have a worm of lower rank, block 614 assigns the head-flit to the previously allocated port and truncates the existing lower rank worm. In effect, the higher ranking worm takes the port. At block 616 a new head-flit is created for the truncated worm. The new head-flit will be assigned to a new output port once it is that head-flit's turn to be assigned, as determined by its ranking. Because the truncated worm has lower rank, it is guaranteed to be considered again after the truncation has occurred.

Truncation of the worm addresses a potential livelock problem when implementing wormhole routing in a bufferless environment. Livelock occurs when a process fails to progress but does not terminate. If entire worms can be deflected, livelock could occur because ranking and prioritization is performed only for head-flits. When a worm arrives at a router, even if it is the oldest flit in the network, it might not get a chance to compete with other worms in other input ports because other worms might already be transmitting their body-flits. In such a case, the oldest worm is deflected instead of being prioritized. This can happen for the same worm in all routers and as a result the worm may never reach its destination, resulting in livelock. Truncation of worms can avoid this problem.

To address this potential problem, in WORM-BLESS each router maintains an allocation of worms to output ports. Once the head-flit of a packet is routed to a specific output port, this port is allocated to this worm until the tail-flit of the worm passes the output port. This allocation may be accomplished by keeping a small table in the router that contains information on which output port is allocated to which worm. This table may also store the packet header information from the original head-flit of a worm, which is then used to create new head-flits when a worm is truncated.

When at block 612 the previously allocated productive port does not have a worm of lower rank, block 618 determines if there is an unallocated non-productive port available. When an unallocated non-productive port is available, block 620 assigns the head-flit to the unallocated non-productive port. In other words, the head-flit and its associated worm is deflected.

When an unallocated non-productive port is not available, block 622 assigns the head-flit to a previously allocated non-productive port and truncates any existing lower ranking worm. Block 616 then creates a new head-flit for the truncated worm.

By combining OF (oldest first) ranking and prioritization with truncation, it is ensured that the oldest flit is always routed to a productive direction. Therefore, the absence of livelocks is guaranteed because the oldest flit always makes progress towards its destination. Furthermore, because of the reduction in head-flits, energy consumption is less than that experienced with FLIT-BLESS in many cases.

WORM-BLESS with Buffers

While bufferless routing has been discussed so far, the WORM-BLESS routing described above with respect to FIG. 6 and FLIT-BLESS routing described above with respect to FIG. 5 may also be used in a fully or "lightly" buffered environments. A "lightly" buffered environment is one where the buffers are reduced in size compared to a fully buffered environment. Deflection routing as described above for FLIT-BLESS and WORM-BLESS still occurs, thus local flow control is still possible. Adding a buffer, even a relatively small one, increases the likelihood that a worm or flit is routed to a productive port.

Figure 7:
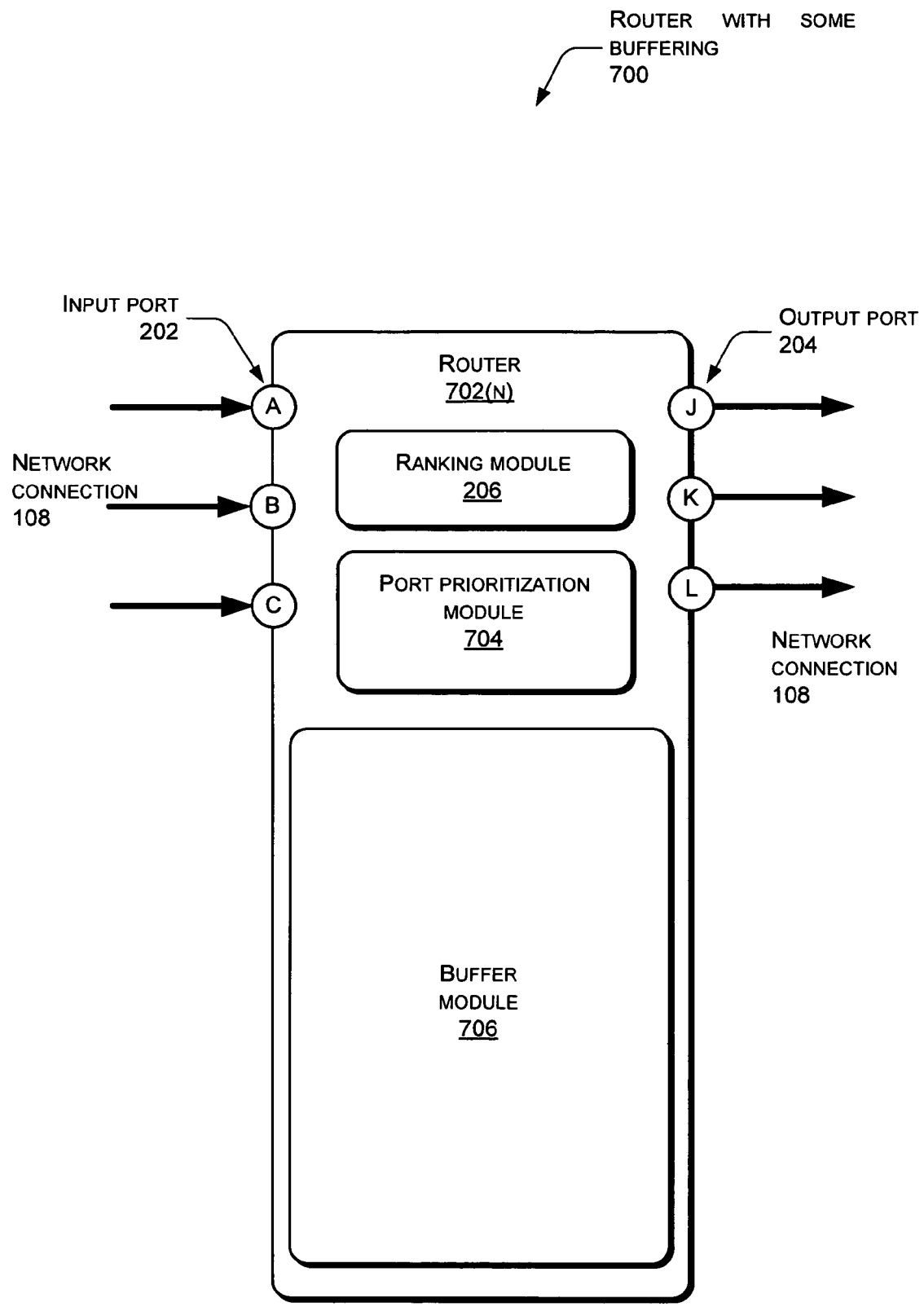
FIG. 7 is a schematic of an illustrative router with a buffer module.

FIG. 7 is a schematic of an illustrative router with a buffer module 700. A router 702, similar to the router shown in FIG. 2, is shown having input ports 202 and output ports. Within router 702 is a ranking module 206, a port prioritization module 704, and a buffer module 706.

Figure 8:
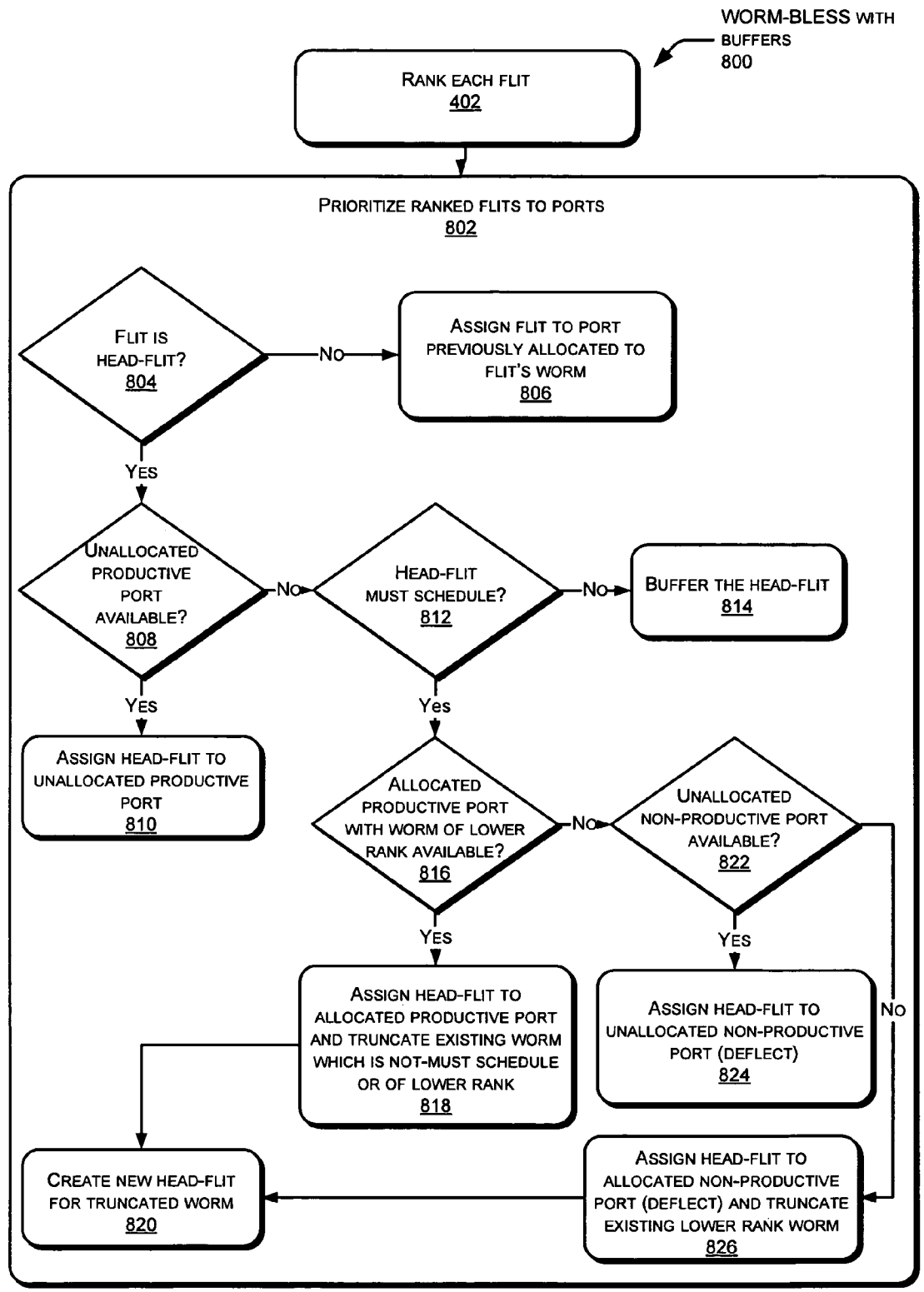
FIG. 8 is a flow diagram of an illustrative WORM-BLESS routing process with buffers.

FIG. 8 is a flow diagram of an illustrative WORM-BLESS routing process with buffers 800. WORM-BLESS prioritizes head-flits of worms and utilizes buffers in limited situations as described next. At block 402, flits are ranked as described above after receipt by input ports. At block 802, ranked flits are prioritized to output ports as described next. Within block 802, block 804 determines whether a flit is a head-flit or not. When a flit is determined at block 804 to not be a head-flit, the flit is a body-flit or tail-flit and assigned to the port previously allocated to that flit's worm.

When block 804 determines a flit to be a head-flit, block 808 determines if an unallocated productive port is available. When an unallocated productive port is available, block 810 assigns the flit to the unallocated productive port.

When an unallocated productive port is not available, block 812 determines if the flit has a must schedule flag set. When no must schedule flag is set, block 814 buffers the flit for later transmission. The must schedule bit indicates whether the flit has to be routed in the current clock cycle.

When the must schedule flag is set, block 816 determines if there is an allocated productive port with a worm of lower rank available. When an allocated productive port is found to have a worm of lower rank or not flagged as must schedule, block 818 assigns the head-flit to the previously allocated port and truncates the existing lower rank or non-must schedule worm that was allocated to that port. In effect, the higher ranking worm takes (or steals) the port. At block 820 a new head-flit is created for the truncated worm. The new head-flit will be allocated to a new output port once it is this head-flit's turn to be assigned, as determined by its ranking.

When at block 816 no allocated productive port with a worm of lower rank is available, block 822 determines if an unallocated non-productive port is available. When an unallocated non-productive port is available, block 824 assigns the head-flit to the unallocated non-productive port, deflecting it.

When no unallocated non-productive port is available, 826 assigns the head-flit to the previously allocated non-productive port and truncates the existing lower ranking worm that was allocated to that port. Block 820 then creates a new head-flit for the truncated worm.

Reducing OCIN Latency with Lookaheads

A bufferless or lightly buffered OCIN can be further optimized by using lookahead techniques. Where worm based routing is not used, every flit is handled as a head-flit as described below.

In a traditional router pipeline, flits undergo three significant stages: A buffer write (and route computation for head-flits), virtual channel allocation and switch allocation, and switch traversal.

Figure 9:
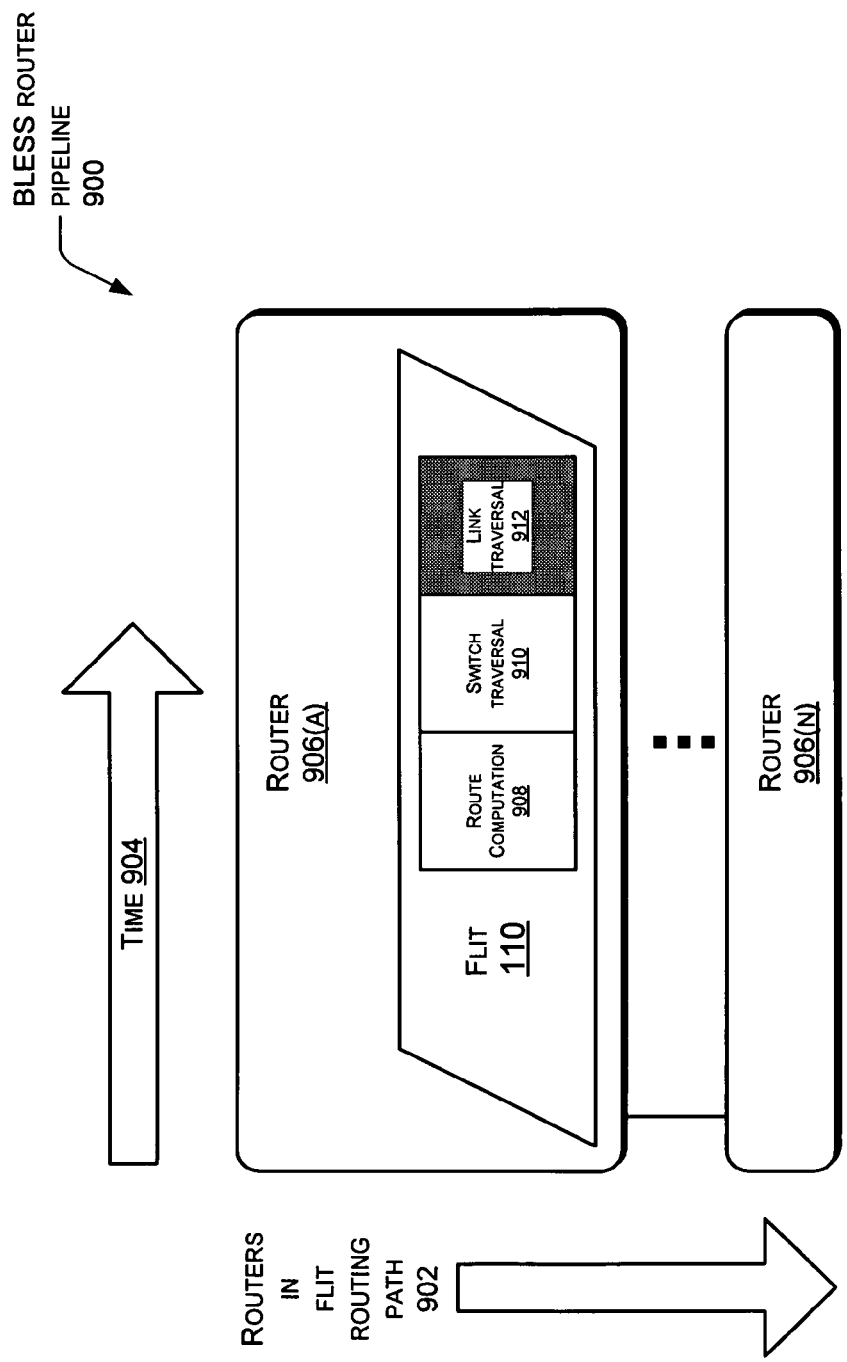
FIG. 9 is a schematic of an illustrative bufferless BLESS router pipeline.

FIG. 9 is a schematic of an illustrative bufferless BLESS router pipeline 900. A bufferless routing environment does not require virtual channels, thus allowing elimination of those stages. In this schematic, the sequence of routers in the flit routing path increases down the page as indicated by arrow 902, while time increases to the right of the page as indicated by arrow 904.

Router 906(A) depicts the router pipeline in a bufferless routing environment. Router 906(A) processes flit 110 (which may be a head-flit or a body-flit). Route computation 908 takes place. Next flit 110 traverses the switch fabric of the router 910 to reach an output port. Finally, flit 110 undergoes link traversal 912 to the next router 906(N). By operating in a bufferless environment, we have reduced from the three stages in a traditional router pipeline to two stages. While this reduction from three stages to two improves performance, further improvements are realized using lookaheads.

Figure 10:
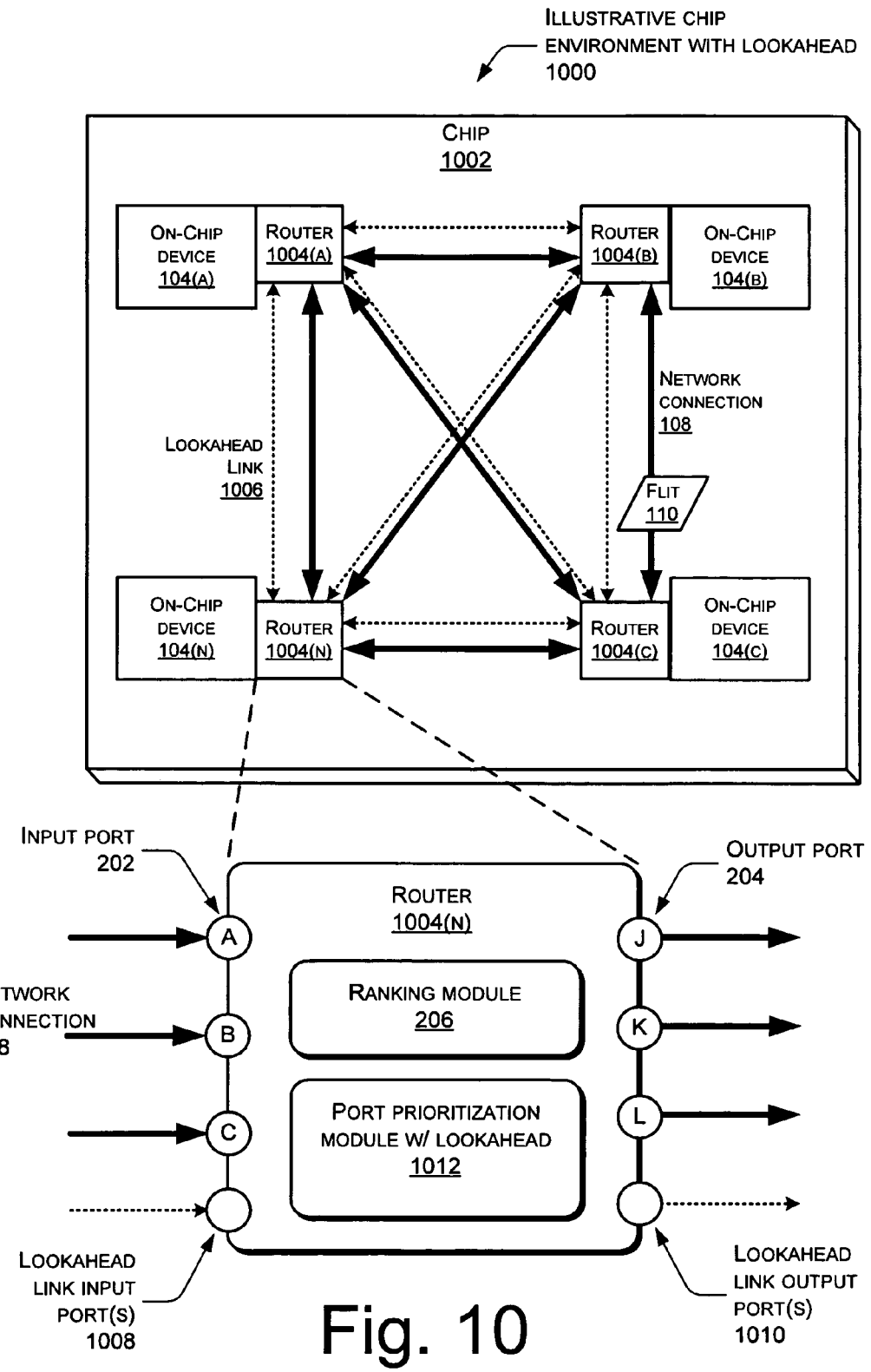
FIG. 10 is an illustrative chip environment with a bufferless on-chip interconnection network having lookahead links.

FIG. 10 is an illustrative chip environment with a bufferless on-chip interconnection network with lookahead links 1000. Similar to FIG. 1 as described above, chip 1002 has on-chip devices 104(A) through 104(N) coupled to routers 1004(A) through 1004(N). Network connections 108 between routers 1004 form a fully connected mesh network where each router has a direct connection to every other router. As described above, any network topology where a router is reachable from every other router is suitable.

A lookahead link 1006 between routers 1004 is also present, forming a secondary fully connected mesh network. Lookahead links 1006 may be narrower in width than the network connections 108.

Router 1004 incorporates lookahead link input ports 1008 and lookahead link output ports 1010. Within router 1004 is a ranking module 206 as described above, and a port prioritization module with lookahead functionality 1012. Port prioritization module may incorporate the same processes described previously, with the modification of being able to receive and process lookahead information. Input ports 202 and output ports 204 are also present. The following pipeline schematic demonstrates the reduction in latency achieved by using a lookahead link.

Figure 11:
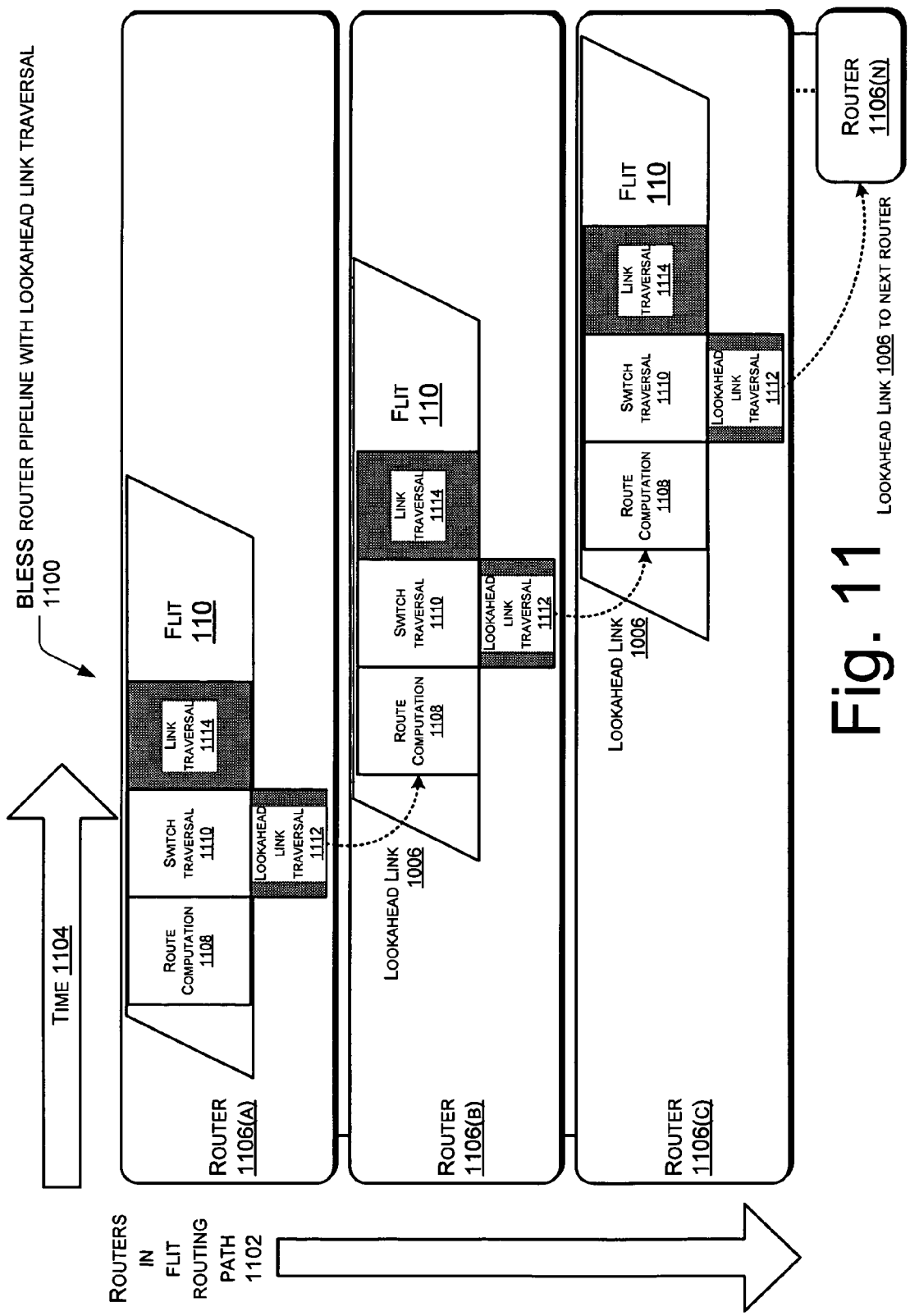
FIG. 11 is a schematic of an illustrative BLESS bufferless router pipeline when lookahead links are in use.

FIG. 11 is a schematic of an illustrative BLESS bufferless router pipeline with lookahead links 1100 and illustrates the advantages of these links. The lookahead links allow information about a flit to travel to the next router while the flit "catches up" (i.e. arrives later in the next cycle). In this schematic, the sequence of routers in the flit routing path increases down the page as indicated by arrow 1102, while time increases to the right of the page as indicated by arrow 1104.

A first router is shown at 1106(A) connected to a second router 1106(B), which is in turn connected to a third router 1106(C) which is in turn connected to another router 1106 (N). These routers are connected via a network connection 108 and a lookahead link 1106. For clarity, network connections to on-chip devices and other routers are omitted.

Router 1106(A) depicts the router pipeline in a bufferless routing environment with lookahead link traversal. Router 1106(A) processes flit 110 (which may be a head-flit or a body-flit). Route computation 1108 takes place. Next flit 110 traverses the switch fabric 1110 of the router 1106(A) to reach an output port while the route information from the flit traverses the lookahead link 1112 to the next hope router 1106(B). While flit 110 undergoes link traversal 1114 from router 1106(A) to 1106(B), router 1106(B) is completes next route computation 1108. When flit 110 completes link traversal 1114 and fully arrives at router 1106(B), route computation 1108 is thus complete, and switch traversal 1110 in router 1106(B) may take place. While flit 110 undergoes switch traversal 1110 in router 1106(B), lookahead information is traversing the lookahead link 1112 to the next router 1106(C). This process may continue to router 1106(N) until the flit reaches its destination.

Thus, while the first router 1106(A) requires completion of two cycles to compute the route 1108 and then traverse the switch 1110, subsequent routers 1106(B) through 1106(N) receive the benefit of the lookahead information. Thus flits 110 may pass through routers 1106(B) through 1106(N) in a single cycle, resulting in reduced latency.

The data sent along the lookahead link in this bufferless environment is not speculative. Since the bufferless router guarantees that a flit will always be routed after it arrives, the lookahead routing performed in the previous cycle never fails.

Figure 12:
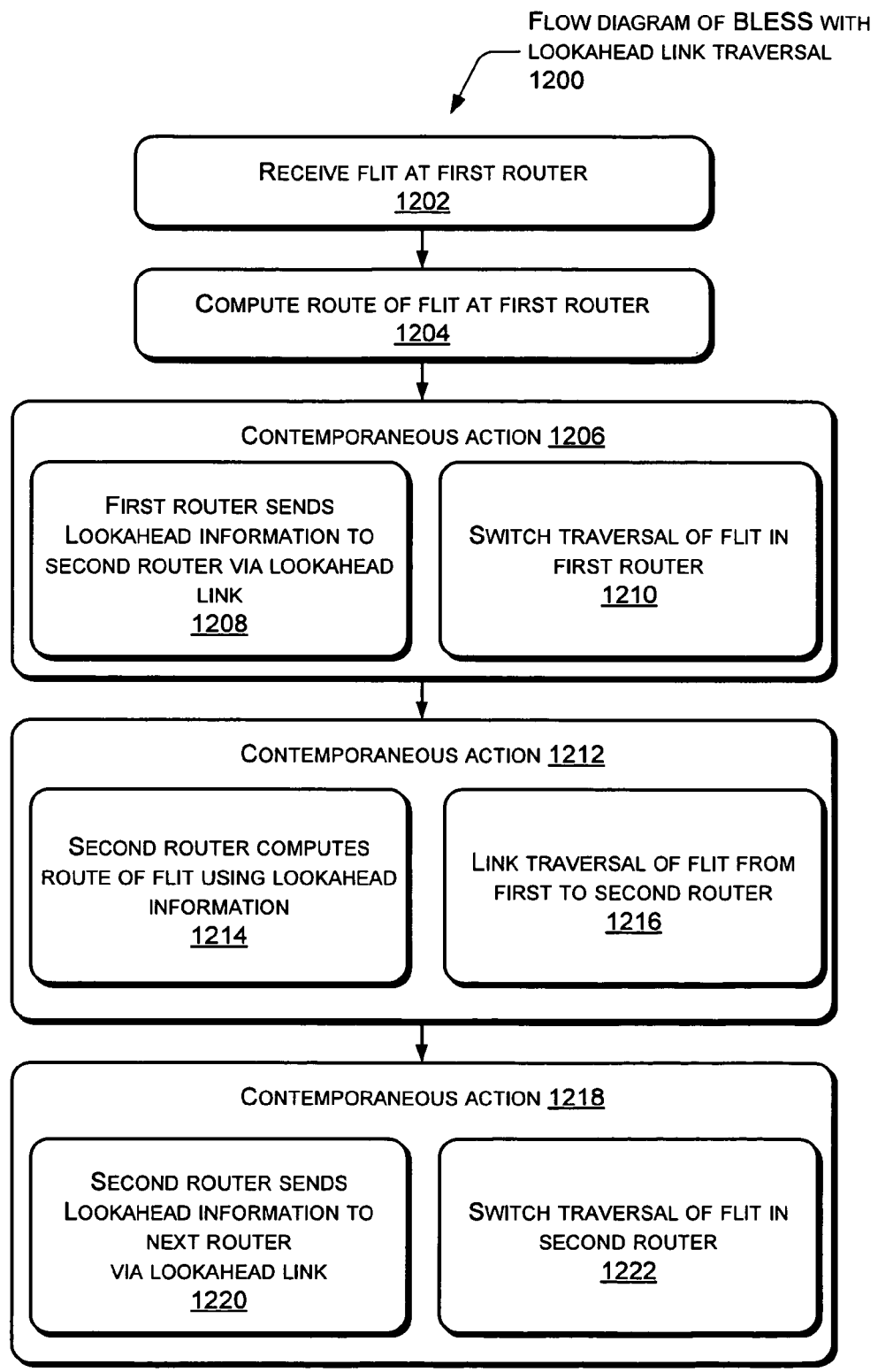
FIG. 12 is a flow diagram of an illustrative bufferless routing process with lookahead link traversal.

FIG. 12 is a flow diagram of an illustrative bufferless routing process with lookahead link traversal 1200. At block 1202, a flit is received at a first router. This flit may be ranked and prioritized according to the previously described processes. At block 1204, the first router computes the route of the flit. At block 1206, two actions occur contemporaneously: At block 1208, the first router sends the lookahead information to a second router via a lookahead link. Meanwhile, at block 1210, the flit traverses the switch in the first router.

At block 1212, two actions occur contemporaneously: At block 1214, the second router computes the next hop in the route of the flit using the lookahead information. Meanwhile, at block 1216, the flit traverses the link from the first router to the second router.

At block 1218, two actions occur contemporaneously: At block 1220, the second router sends the look ahead information to the next router via the lookahead link. Meanwhile, at block 1222, the flit traverses the switch of the second router.

This process continues on, until the flit finally reaches its destination. As described above, this use of lookahead links reduces latency in all routers after the first in a route path to a single step.

CONCLUSION

Although specific details of illustrative methods are described with regard to the figures and other flow diagrams presented herein, it should be understood that certain acts shown in the figures need not be performed in the order described, and may be modified, and/or may be omitted entirely, depending on the circumstances. As described in this application, modules and engines may be implemented using software, hardware, firmware, or a combination of these. Moreover, the acts, processes, and methods described may be implemented by a computer, processor or other computing device based on instructions stored on memory, the memory comprising one or more computer-readable storage media (CRSM).

The CRSM may be any available physical media accessible by a computing device to implement the instructions stored thereon. CRSM may include, but is not limited to, random access memory (RAM), read-only memory (ROM), electrically erasable programmable read-only memory (EEPROM), flash memory or other solid-state memory technology, compact disk read-only memory (CD-ROM), digital versatile disks (DVD) or other optical disk storage, magnetic cassettes, magnetic tape, magnetic disk storage or other magnetic storage devices, or any other medium which can be used to store the desired information and which can be accessed by a computing device.

What is claimed is:

1. A method of deflection routing in an on-chip interconnection network having one or more on-chip routers, the method comprising:

receiving a flow control digit (flit) at an input port of a first on-chip router, each on-chip router in the on-chip interconnection network comprising a number of output ports greater than or equal to a number of input ports, the output ports in communication with other on-chip routers, each on-chip router reachable from every other on-chip router via one or more on-chip network connections;

ranking the flit within the first on-chip router;

prioritizing the ranked flit to a prioritized output port among the output ports of the first on-chip router;

sending the flit towards a destination via the prioritized output port;

computing a route of the flit at the first on-chip router;

sending lookahead information including the route of the flit from the first on-chip router to a second on-chip router via a lookahead link contemporaneously with the flit traversing a portion of the first on-chip router;

allocating a designated output port to a worm comprising a sequence of related flits; and truncating a lower ranking worm previously allocated to the designated output port.

2. The method of claim 1, wherein the ranking comprises assigning older flits a higher rank than newer flits.

3. The method of claim 1, wherein the on-chip router comprises a bufferless router and the prioritizing further comprises:

routing the flit independently of another flit;

routing the flit to a productive output port when the productive output port is available, wherein the productive output port provides a more direct path to the flit's destination than the non-productive output port; and deflecting flits when productive output ports are unavailable.

4. The method of claim 1, wherein the on-chip router comprises a bufferless router and the prioritizing comprises:

prioritizing flits in the worm to the designated output port.

5. The method of claim 1, wherein at least one of the one or more on-chip routers comprises a buffer configured to store flits and the prioritizing further comprises:

allocating the designated output port to a second worm designated as must schedule and truncating or deflecting a second lower ranking worm previously allocated to the designated output port;

prioritizing flits in the second worm to the designated output port; and buffering flits of a non-must schedule worm.

6. The method of claim 1, further comprising:

computing the route of the flit at the second on-chip router using the lookahead information from the first on-chip router while the flit traverses the lookahead link from the first on-chip router to the second on-chip router; and sending lookahead information containing the route of the flit from the second on-chip router to a next on-chip router via a lookahead link while the flit traverses a second switch in the second on-chip router.

7. The method of claim 1, wherein the lookahead link is separate from the network connection between on-chip routers.

8. A system that includes an on-chip interconnection network, the on-chip interconnection network to perform acts comprising:

receiving two or more flow control digits (flits) at an input port of an on-chip router:

ranking the two or more flits within the on-chip router;

prioritizing the two or more ranked flits within the on-chip router;

sending one or more of the prioritized flits over a productive output port of the on-chip router when the productive output port is available, the productive output port providing a shorter path to a destination of the flit than a non-productive output port;

deflecting the one or more prioritized flits over the non-productive output port of the on-chip router when the productive output port is unavailable;

computing a route of the flit at the first on-chip router;

sending lookahead information including the route of the flit from the on-chip router to a second on-chip router via a lookahead link during the traversal of a portion of the on-chip router by the flit;

determining whether a particular flit of the prioritized flits is a head-flit or a body-flit of a worm, the worm comprising a sequence of related flits that includes the head-flit and one or more body-flits; and when an unallocated productive output port is available, assigning the head-flit to an unallocated productive output port.

9. The system of claim 8, further comprising receiving the two or more flits by electrically conductive pathways.

10. The system of claim 8, wherein the on-chip router comprises a buffer configured to store flits.

11. The system of claim 8, wherein each on-chip router in the on-chip interconnection network comprises a number of output ports greater than or equal to a number of input ports and is reachable from every other on-chip router via one or more on-chip network connections.

12. The system of claim 8, wherein the on-chip router comprises a bufferless router and the prioritizing comprises:

assigning the body-flit to an output port previously allocated to the body-flit's worm;

when an unallocated productive output port is unavailable, assigning the head-flit to an allocated productive output port allocated to a lower ranking worm and truncating the lower ranking worm;

when an allocated productive output port having the lower ranking worm is unavailable, assigning the head-flit to an unallocated non-productive output port;

when an unallocated non-productive port is unavailable, assigning the head-flit to an allocated non-productive output port allocated to a lower ranking worm and truncating the lower ranking worm; and creating a new head-flit for a truncated worm when a worm is truncated.

13. The system of claim 8, wherein at least one of the one or more on-chip routers has a buffer and the prioritizing comprises:

assigning the body-flit to an output port previously allocated to the body-flit's worm;

when no unallocated productive output port is available, determining if the head-flit is flagged as must schedule;

in response to determining that the head-flit is not flagged as must schedule, buffering the head-flit;

in response to determining that the head-flit is flagged as must schedule, assigning the head-flit to an allocated productive output port allocated to a lower ranking worm and truncating the lower ranking worm;

when no allocated productive output port having the lower ranking worm is available to the head-flit flagged as must schedule, assigning the head-flit flagged as must schedule to an unallocated non-productive output port;

when no unallocated non-productive output port is available to the head-flit flagged as must schedule, assigning the head-flit to an allocated non-productive output port allocated to a lower ranking worm and truncating the lower ranking worm; and creating a new head-flit for a truncated worm when a worm is truncated.

14. A memory device including instructions that are executable by processing logic to perform acts comprising:

receiving a flow control digit (flit) at an input port of a first on-chip router, each on-chip router in the on-chip interconnection network comprising a number of output ports greater than or equal to a number of input ports, the output ports in communication with other on-chip routers, each on-chip router reachable from every other on-chip router via one or more on-chip network connections;

ranking the flit within the first on-chip router;

prioritizing the ranked flit to a prioritized output port among the output ports of the first on-chip router;

sending the flit towards a destination via the prioritized output port;
computing a route of the flow control digit (flit) at the first on-chip router;
sending lookahead information containing the route of the flit to a second on-chip router via a first lookahead link between the first on-chip router and the second on-chip router while the flit traverses the switch in the first on-chip router;
computing the route of the flit at the second on-chip router using the lookahead information from the first on-chip router while the flit traverses a network connection link from the first on-chip router to the second on-chip router; and
sending lookahead information containing the route of the flit to a next on-chip router via a second lookahead link between the second on-chip router and the next on-chip router while the flit traverses the switch in the second on-chip router.

15. The memory device of claim 14, wherein at least one of the on-chip routers has a buffer.

16. The memory device of claim 14, wherein the first and second lookahead links are separate from the network connection between on-chip routers.

17. A method of local flow control of flow control digits (flits) in an on-chip interconnection network, the method comprising:
receiving a flow control digit (flit) at an input port of a first on-chip router, each on-chip router in the on-chip interconnection network comprising a number of output ports greater than or equal to a number of input ports, the output ports in communication with other on-chip routers, each on-chip router reachable from every other on-chip router via one or more on-chip network connections;
ranking the flit within the first on-chip router;
prioritizing the ranked flit to a prioritized output port among the output ports of the first on-chip router;
sending the flit towards a destination via the prioritized output port; computing a route of the flit at the first on-chip router;
sending lookahead information including the route of the flits from the first on-chip router to a second on-chip router via a lookahead link while the flits traverse a first switch in the first on-chip router;
allocating a designated output port to a worm comprising a sequence of related flits; and truncating a lower ranking worm previously allocated to the designated output port.

18. The method of claim 17, wherein the on-chip router comprises a bufferless router and the prioritizing further comprises:
routing the flit independently of another flit;
routing the flit to a productive output port when the productive output port is available, wherein the productive output port provides a more direct path to the flit's destination than the non-productive output port; and
deflecting flits when productive output ports are unavailable.

19. The method of claim 17, wherein at least one of the one or more on-chip routers comprises a buffer configured to store flits and the prioritizing further comprises:
allocating the designated output port to a second worm designated as must schedule and truncating or deflecting a second lower ranking worm previously allocated to the designated output port;
prioritizing flits in the second worm to the designated output port; and buffering flits of a non-must schedule worm.

20. The method of claim 17, further comprising:
computing the route of the flit at the second on-chip router using the lookahead information from the first on-chip router while the flit traverses the lookahead link from the first on-chip router to the second on-chip router; and
sending lookahead information containing the route of the flit from the second on-chip router to a next on-chip router via a lookahead link while the flit traverses a second switch in the second on-chip router.

* * * * *